LYDIA A. FRISTOE.
Baking-Pan.
No. 168,089. Patented Sept. 28, 1875.
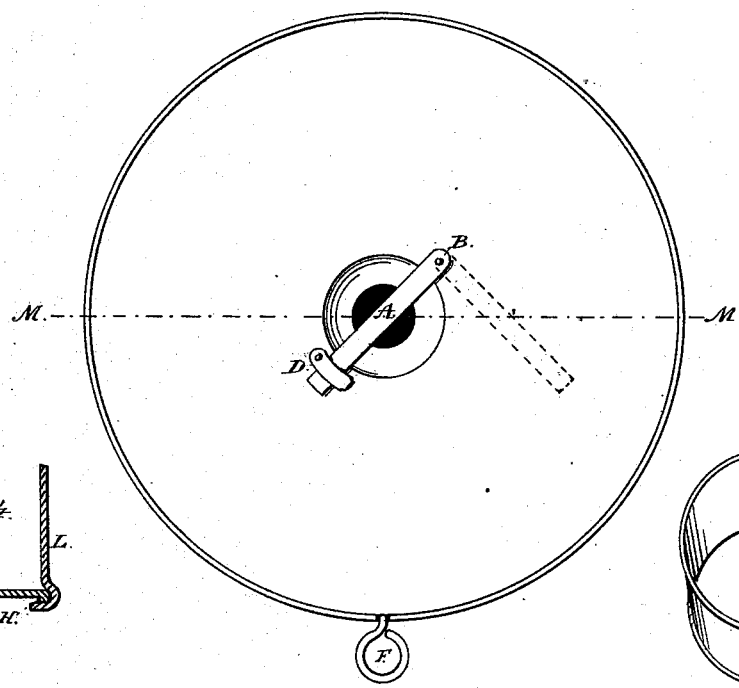
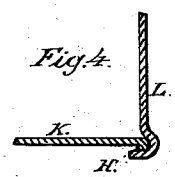
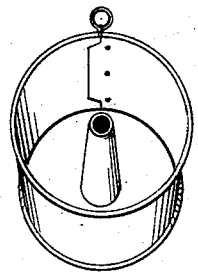
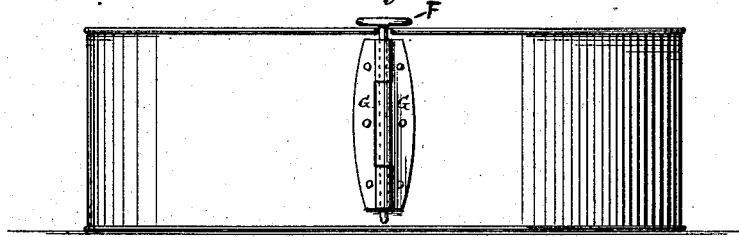
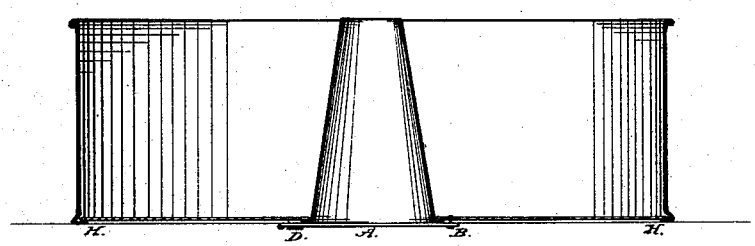
Witnesses:
Inventor:
Lydia A Fristoe
Her Attorney
L. Cutshaw

UNITED STATES PATENT OFFICE.

LYDIA A. FRISTOE, OF DENVER, COLORADO TERRITORY.

IMPROVEMENT IN BAKING-PANS.

Specification forming part of Letters Patent No. 168,089, dated September 28, 1875; application filed June 5, 1875.

*To all whom it may concern:*

Be it known that I, LYDIA A. FRISTOE, of Denver, Colorado Territory, have invented an Improvement in Baking-Pans, of which the following is a specification:

The object of this improvement is, first, to provide a means of removing the baked contents of the dish or pan without injury or soiling; second, provide a raised groove on the bottom of the pan or dish, to allow air between the oven and pan-bottom, thus preventing the contents from being burned.

Figure 1 is a plan of the bottom of the pan, showing the means of removing the center funnel from the inside of the baked contents.

A is a metal bar, that turns freely on its joint B and slips under the clasp D. To remove the funnel, it is only necessary to move back the bar A to the position indicated by the dotted lines, and the center piece can be readily drawn out.

Fig. 2 is a plane elevation, showing the means of clasping and unclasping the outside or circumference from the bottom. To remove the bottom, together with the baked contents, withdraw the pin F from out the clasp G, thus releasing the sides or circumference, and the bottom drops out of the groove H.

Fig. 4 is a section of this groove H on an enlarged scale. K is the bottom; L, the sides.

Fig. 3 is a section of the dish on the lines M M. Fig. 5 is a perspective view of the dish put together, ready for charging with its contents.

What I claim as new and useful, and desire to secure by Letters Patent, is—

The combination of the hoop L, provided with the clasp, pin, and groove, as specified, and the bottom K, as shown and described.

In witness whereof I have hereunto set my hand and seal this 27th day of May, 1875.

LYDIA A. FRISTOE. [L. S.]

Witnesses:
  W. H. J. NICHOLS,
  W. S. NEWMAN,
  C. H. FRISTOE.